United States Patent
Thorstensen-Woll et al.

(10) Patent No.: US 8,703,265 B2
(45) Date of Patent: Apr. 22, 2014

(54) CONTAINER SEAL WITH REMOVAL TAB AND PIERCABLE HOLOGRAPHIC SECURITY SEAL

(75) Inventors: Robert William Thorstensen-Woll, Barrie (CA); Joseph Smelko, Cornwall (CA)

(73) Assignee: Selig Sealing Products, Inc., Forrest, IL (US)

(*) Notice: Subject to any disclaimer, the term of this patent is extended or adjusted under 35 U.S.C. 154(b) by 1086 days.

(21) Appl. No.: 12/026,723

(22) Filed: Feb. 6, 2008

(65) Prior Publication Data

US 2008/0233424 A1  Sep. 25, 2008

Related U.S. Application Data

(60) Provisional application No. 60/896,816, filed on Mar. 23, 2007.

(51) Int. Cl.
- *G09F 3/03* (2006.01)
- *B32B 7/06* (2006.01)
- *B32B 7/12* (2006.01)
- *B32B 15/08* (2006.01)

(52) U.S. Cl.
CPC ............... *G09F 3/0341* (2013.01); *B32B 7/06* (2013.01); *B32B 7/12* (2013.01); *B32B 15/08* (2013.01)
USPC .......... 428/66.4; 428/480; 215/201; 215/203; 215/204; 215/230; 215/232; 215/258; 215/347; 283/81; 283/101

(58) Field of Classification Search
CPC ....... G09F 3/03; G09F 3/0305; G09F 3/0376; G09F 3/0341; B65D 43/0235; B65D 43/02; B25D 41/00; B25D 41/325; B32B 7/06; B32B 7/12; B32B 15/08
USPC ......... 215/201, 203, 347, 250, 251, 232, 206, 215/230; 283/81, 101, 72, 74, 100, 103; 428/66.4, 480, 483

See application file for complete search history.

(56) References Cited

U.S. PATENT DOCUMENTS 4,013,188 A * 3/1977 Ray ............................. 215/347
4,206,165 A   6/1980 Dukess
(Continued)

FOREIGN PATENT DOCUMENTS

AT  501 393 A1  8/2006
AT  11 738 U1   4/2011
(Continued)

*Primary Examiner* — Callie Shosho
*Assistant Examiner* — Nicholas Kokkinos
(74) *Attorney, Agent, or Firm* — Fitch, Even, Tabin & Flannery LLP

(57) ABSTRACT

A holographic sealing member for a container including a heat actuated sealant or adhesive layer that secures the sealing member to a container. The sealing member also includes a metal foil sealing layer over and covering and bonded to the heat actuated sealant or adhesive layer, a holographic layer over and covering and bonded to the metal foil layer having an upper plastic layer and a lower embossed image layer, and a tab over and covering and bonded to the upper plastic layer. The tab may be pulled to remove the tab and the plastic layer from a container, thereby exposing the lower embossed image layer which may then be perforated to gain access to the contents of the container.

15 Claims, 1 Drawing Sheet

(56) References Cited

U.S. PATENT DOCUMENTS

| | | | |
|---|---|---|---|
| 4,266,687 A * | 5/1981 | Cummings | 220/257.2 |
| 4,438,850 A * | 3/1984 | Kahn | 229/123.1 |
| 4,514,248 A * | 4/1985 | Cummings | 156/268 |
| 4,579,240 A | 4/1986 | Ou-Yang | |
| 4,650,082 A | 3/1987 | Paciorek | |
| 4,741,791 A | 5/1988 | Howard et al. | |
| 4,767,016 A * | 8/1988 | Cook et al. | 215/230 |
| 4,837,061 A | 6/1989 | Smits et al. | |
| 4,856,857 A * | 8/1989 | Takeuchi et al. | 359/3 |
| 4,892,209 A | 1/1990 | Dorfman et al. | |
| 4,934,544 A | 6/1990 | Han et al. | |
| 4,961,986 A | 10/1990 | Galda et al. | |
| 4,980,222 A | 12/1990 | Rivera et al. | |
| 4,994,314 A | 2/1991 | Rosenfeld et al. | |
| 5,004,111 A | 4/1991 | McCarthy | |
| 5,015,318 A | 5/1991 | Smits et al. | |
| 5,055,150 A | 10/1991 | Rosenfeld et al. | |
| 5,057,365 A | 10/1991 | Finkelstein et al. | |
| 5,071,710 A | 12/1991 | Smits et al. | |
| 5,084,143 A | 1/1992 | Smith | |
| 5,098,495 A | 3/1992 | Smits et al. | |
| 5,128,779 A | 7/1992 | Mallik | |
| 5,135,262 A | 8/1992 | Smith et al. | |
| 5,149,386 A | 9/1992 | Smits et al. | |
| 5,153,042 A | 10/1992 | Indrelie | |
| 5,160,767 A | 11/1992 | Genske et al. | |
| 5,169,707 A | 12/1992 | Faykish et al. | |
| 5,178,967 A | 1/1993 | Rosenfeld et al. | |
| 5,197,618 A * | 3/1993 | Goth | 215/232 |
| 5,218,472 A | 6/1993 | Jozefowicz et al. | |
| 5,226,281 A | 7/1993 | Han et al. | |
| 5,265,745 A * | 11/1993 | Pereyra et al. | 215/232 |
| 5,319,475 A | 6/1994 | Kay et al. | |
| 5,510,171 A * | 4/1996 | Faykish | 428/32.62 |
| 5,514,442 A | 5/1996 | Galda et al. | |
| 5,544,770 A | 8/1996 | Travisano | |
| 5,598,940 A | 2/1997 | Finkelstein et al. | |
| 5,601,200 A | 2/1997 | Finkelstein et al. | |
| 5,615,789 A | 4/1997 | Finkelstein et al. | |
| 5,656,360 A | 8/1997 | Faykish et al. | |
| 5,669,521 A | 9/1997 | Wiening et al. | |
| 5,702,015 A | 12/1997 | Giles et al. | |
| 6,082,566 A * | 7/2000 | Yousif et al. | 215/232 |
| 6,120,882 A | 9/2000 | Faykish et al. | |
| 6,131,754 A | 10/2000 | Smelko | |
| 6,139,931 A | 10/2000 | Finkelstein et al. | |
| 6,194,042 B1 | 2/2001 | Finkelstein et al. | |
| 6,197,396 B1 * | 3/2001 | Haas et al. | 428/40.1 |
| 6,258,425 B1 | 7/2001 | Parmentier et al. | |
| 6,284,337 B1 | 9/2001 | Lorimor et al. | |
| 6,312,776 B1 | 11/2001 | Finkelstein et al. | |
| 6,351,537 B1 | 2/2002 | Dovgodko et al. | |
| 6,378,715 B1 | 4/2002 | Finkelstein et al. | |
| 6,458,302 B1 | 10/2002 | Shifflet | |
| 6,494,491 B1 | 12/2002 | Zeiter et al. | |
| 6,531,230 B1 | 3/2003 | Weber et al. | |
| 6,602,309 B2 | 8/2003 | Vizulis et al. | |
| 6,659,507 B2 | 12/2003 | Banahan | |
| 6,699,566 B2 | 3/2004 | Zeiter et al. | |
| 6,705,467 B1 | 3/2004 | Kancsar et al. | |
| 6,722,272 B2 | 4/2004 | Jud | |
| 6,737,154 B2 | 5/2004 | Jonza et al. | |
| 6,767,425 B2 | 7/2004 | Meier | |
| 6,775,036 B2 | 8/2004 | Cox et al. | |
| 6,866,926 B1 | 3/2005 | Smelko et al. | |
| 6,902,075 B2 * | 6/2005 | O'Brien et al. | 215/232 |
| 6,916,516 B1 | 7/2005 | Gerber et al. | |
| 6,955,736 B2 | 10/2005 | Rosenberger et al. | |
| 6,974,045 B1 | 12/2005 | Trombach et al. | |
| 7,005,178 B2 | 2/2006 | Bonkowski et al. | |
| 7,012,032 B2 | 3/2006 | Cosentino et al. | |
| 7,029,745 B2 | 4/2006 | Bonkowski et al. | |
| 7,064,897 B2 | 6/2006 | Hebrink et al. | |
| 7,128,210 B2 | 10/2006 | Razeti et al. | |
| 7,144,617 B2 | 12/2006 | Schilling et al. | |
| 7,182,475 B2 | 2/2007 | Kramer et al. | |
| 7,224,528 B2 | 5/2007 | Phillips et al. | |
| RE39,790 E | 8/2007 | Fuchs et al. | |
| 7,316,760 B2 | 1/2008 | Nageli | |
| 7,448,153 B2 | 11/2008 | Maliner et al. | |
| 7,531,228 B2 | 5/2009 | Perre et al. | |
| 7,713,605 B2 | 5/2010 | Yousif et al. | |
| 7,740,927 B2 | 6/2010 | Yousif et al. | |
| 7,819,266 B2 | 10/2010 | Ross et al. | |
| 7,838,109 B2 | 11/2010 | Declerck | |
| 2002/0068140 A1 | 6/2002 | Finkelstein et al. | |
| 2004/0109963 A1 | 6/2004 | Zaggia et al. | |
| 2004/0209028 A1 | 10/2004 | Gosselin | |
| 2005/0048307 A1 | 3/2005 | Schubert et al. | |
| 2005/0208242 A1 | 9/2005 | Smelko et al. | |
| 2006/0000545 A1 | 1/2006 | Nageli et al. | |
| 2006/0003120 A1 | 1/2006 | Nageli et al. | |
| 2006/0003122 A1 | 1/2006 | Nageli et al. | |
| 2006/0151415 A1 | 7/2006 | Smelko et al. | |
| 2007/0058227 A1 | 3/2007 | Raksha et al. | |
| 2007/0183047 A1 | 8/2007 | Phillips et al. | |
| 2007/0195392 A1 | 8/2007 | Phillips et al. | |
| 2007/0206249 A1 | 9/2007 | Phillips et al. | |
| 2007/0298273 A1 | 12/2007 | Thies et al. | |
| 2008/0026171 A1 | 1/2008 | Gullick et al. | |
| 2008/0103262 A1 | 5/2008 | Haschke | |
| 2008/0156443 A1 | 7/2008 | Schaefer et al. | |
| 2008/0257850 A1 | 10/2008 | O'Keefe-Broadbent | |
| 2009/0078671 A1 | 3/2009 | Triquet et al. | |
| 2009/0208729 A1 | 8/2009 | Allegaert et al. | |
| 2010/0009162 A1 | 1/2010 | Rothweiler | |
| 2010/0030180 A1 | 2/2010 | Declerck | |
| 2010/0059942 A1 | 3/2010 | Rothweiler | |
| 2010/0116410 A1 | 5/2010 | Yousif | |
| 2010/0155288 A1 | 6/2010 | Harper et al. | |
| 2010/0170820 A1 | 7/2010 | Leplatois et al. | |
| 2010/0213193 A1 | 8/2010 | Helmlinger et al. | |
| 2010/0221483 A1 | 9/2010 | Gonzalez Carro et al. | |
| 2010/0290663 A1 | 11/2010 | Trassl et al. | |
| 2010/0314278 A1 | 12/2010 | Fonteyne et al. | |
| 2011/0000917 A1 | 1/2011 | Wolters et al. | |
| 2011/0005961 A1 | 1/2011 | Leplatois et al. | |
| 2011/0091715 A1 | 4/2011 | Rakutt et al. | |

FOREIGN PATENT DOCUMENTS

| | | |
|---|---|---|
| BR | 8200231 U | 9/2003 |
| BR | 0300992 A | 11/2004 |
| DE | 102 04 281 A1 | 8/2003 |
| DE | 10 2006 030 118 B3 | 5/2007 |
| DE | 10 2007 022 935 B4 | 4/2009 |
| DE | 20 2009 000 245 U1 | 4/2009 |
| EP | 0 668 221 A1 | 8/1995 |
| EP | 0 826 598 A2 | 3/1998 |
| EP | 0 826 599 A2 | 3/1998 |
| EP | 0 717 710 B1 | 4/1999 |
| EP | 0 915 026 A1 | 5/1999 |
| EP | 0 706 473 B1 | 8/1999 |
| EP | 0 803 445 B1 | 11/2003 |
| EP | 1 834 893 A1 | 9/2007 |
| EP | 1 839 898 A1 | 10/2007 |
| EP | 1 839 899 A1 | 10/2007 |
| EP | 1 857 275 A1 | 11/2007 |
| EP | 1 873 078 A1 | 1/2008 |
| EP | 1 445 209 B1 | 5/2008 |
| EP | 1 918 094 A1 | 5/2008 |
| EP | 1 935 636 A1 | 6/2008 |
| EP | 1 968 020 A1 | 9/2008 |
| EP | 1 992 476 A1 | 11/2008 |
| EP | 2 230 190 A1 | 9/2010 |
| EP | 2 292 524 A1 | 3/2011 |
| FR | 2 754 375 A1 | 4/1998 |
| FR | 2 916 157 A1 | 11/2008 |
| FR | 2 943 322 A1 | 9/2010 |
| GB | 2241230 A | 8/1991 |
| GB | 2 273 492 A | 6/1994 |
| GB | 2 298 391 A | 9/1996 |
| JP | 2004-315035 A | 11/2004 |
| JP | 2000-255621 A | 9/2009 |

(56) References Cited

FOREIGN PATENT DOCUMENTS

| | | |
|---|---|---|
| KR | 10-0711073 B1 | 4/2007 |
| KR | 10-0840926 B1 | 6/2008 |
| KR | 10-0886955 B1 | 3/2009 |
| MX | PA05002905 A | 2/2006 |
| MX | 2010001867 A | 4/2010 |
| TW | 194965 | 11/1992 |
| WO | 89/02402 A1 | 3/1989 |
| WO | 93/08084 A1 | 4/1993 |
| WO | 97/02997 A1 | 1/1997 |
| WO | 00/66450 A1 | 11/2000 |
| WO | 2005/100186 A1 | 10/2005 |
| WO | 2006018556 A1 | 2/2006 |
| WO | 2006021291 A1 | 3/2006 |
| WO | 2006/099260 A1 | 9/2006 |
| WO | 2006/108853 A1 | 10/2006 |
| WO | 2007/109113 A2 | 9/2007 |
| WO | 2008027029 A2 | 3/2008 |
| WO | 2008027036 A1 | 3/2008 |
| WO | 2008039350 A2 | 4/2008 |
| WO | 2008125784 A1 | 10/2008 |
| WO | 2008125785 A1 | 10/2008 |
| WO | 2008148176 A1 | 12/2008 |
| WO | 2010115811 A1 | 10/2010 |
| WO | 2011039067 A1 | 4/2011 |

\* cited by examiner

CONTAINER SEAL WITH REMOVAL TAB AND PIERCABLE HOLOGRAPHIC SECURITY SEAL

CROSS-REFERENCE TO RELATED APPLICATION

This application claims priority pursuant to 35 U.S.C. 119(e) to U.S. Provisional Application No. 60/896,816, filed on Mar. 23, 2007 which is incorporated herein by reference in its entirety.

BACKGROUND OF THE INVENTION

1. Field of the Invention

The invention relates generally to a laminated sealing member for closing the mouth of a container, the sealing member having a graspable tab on its upper surface to expedite its removal from the container, and the sealing member also having a holographic security seal layer.

2. Description of Related Art

In the figures, the first digit of the reference numbers correspond to the figure number. The remaining two digits of the reference numbers for elements within the various figures that correspond to each other always match. Hence, the bottom hot melt adhesive layer, which is essentially same in all of the figures, is assigned the reference number 122 in FIG. 1, 222 in FIG. 2, 322 in FIG. 3, and 422 in FIG. 4.

It is often desirable to seal a bottle, jar, or other container having a screw-on cap by providing a sealing member that attaches across the mouth of the container before the cap is screwed down onto the container for the first time. When the cap is later removed after purchase, the purchaser must penetrate, break, or otherwise remove the sealing member before the contents of the container may be accessed. The cap may then be screwed back into place to keep the contents fresh and to keep the contents from spilling out. If the sealing member is not present when the container is first opened, or if it is damaged, then the purchaser knows that the contents of the container may have been tampered with. And as an anti-counterfeiting measure, such a sealing member may include a hologram visible to the purchaser after the cap is removed, the pattern of the hologram being a unique identifier of a particular manufacturer.

Many sealing members are known which have tabs attached to their upper surface to facilitate their removal. One simply grasps the tab and pulls it to one side, and the entire sealing member is removed from the container in a single motion.

U.S. Pat. No. 5,514,442, which issued to Michael P. Galda, et al. on May 7, 1996 discloses the sealing member 100 shown, in a side cross-sectional view, in FIG. 1 (which is derived from FIG. 4 of the '442 patent). (For clarity, the cross sectioning lines have been omitted from the layers 102, 104, and 110 in FIG. 1 and are shown in the urethane adhesive layers 114 and 116 and hot melt bonding material or adhesive layer 122.) The sealing member 100 is a laminated structure the lower half of which is formed from an aluminium foil layer 110 the underside of which is bonded to a hot melt bonding material or adhesive layer 122. The upper half of the sealing member 100 is formed from a sheet of bleached kraft paper 102 the lower half of which is glued to a polyester layer 104 (most likely a sheet or film of PET, or Polyethylene Terephthalate). As shown, the upper and lower halves of the sealing member 100 are joined by means of an adhesive layer 116 which extends only half way (left-to-center) and which joins the aluminium foil layer 110 to the polyester layer 104, leaving a gap 124 to the right. The sealing member 100 is circular and is die-cut from a much larger sheet of laminated materials, the cutting being positioned to cause the gap 124 to be present in each sealing member 100, thereby forming a removal tab that comprises the kraft paper 102 and the polyester 104 layer above the gap 124 to the right in FIG. 1. The '442 patent teaches that this circular sealing member 100 is inserted deep into a screw-on cap (not shown) which is then screwed onto a container (not shown). Induction heating applied to the neck of the container then heats up the aluminium foil layer 110, causing the hot melt bonding material or adhesive layer 122 to melt and thereby seal the sealing member 100 to the top of the container. After the container is purchased, the purchaser removes the cap and then grasps and pulls on the removal tab and thereby removes the sealing member 100 from the container.

U.S. Pat. No. 6,866,926, which issued to Joe Smelko et al on Mar. 15, 2005, teaches the design of an improved sealing member 200 which is shown, in a side cross-sectional view, in FIG. 2 ((which corresponds to FIG. 3 of the '926 patent). (For clarity, the cross-sectional lines have been omitted from the layers 202, 204, 206, 208, 210, and 212 in FIG. 2 and are shown in the urethane adhesive layers 218 and 220 and hot melt bonding material or adhesive layer 222.) The upper layers of the sealing member 200 comprise an upper PET layer 202 bonded to a lower EVA (ethylene-vinyl acetate) layer 204. The lower layers comprise an aluminium foil layer 210 which is bonded to a PET layer 212 which in turn is bonded to a hot melt bonding material or adhesive layer 322. This design adds a PE (polyethylene) foam layer 208 over the upper surface of the aluminium foil layer 210, as is illustrated in FIG. 2 (which corresponds to FIG. 3 of the '926 patent). The EVA layer 204 is heat bonded to the new PE foam layer 208 in the left half of the sealing member 200, as is shown. To the right, a release strip 206, made of PET, is coated on its underside with a silicon release coating to prevent the strip 406 from sticking to the PE foam layer 208. The PET release strip 206 and the PET upper layer 202 sandwich the left half of the EVA layer 204 to a release tab. The EVA layer 204 and the PE foam layer 208 are heat bonded together.

Several patents teach the incorporation of holographic film into various types of seals for packages and containers. Such holographic sealing members enable counterfeit products to be identified and also signal, by their condition when the seals have previously been tampered with.

Once such Holographic seal is disclosed in U.S. Pat. No. 5,319,475, which issued to Ralph Kay, et al on Jun. 7, 1994. This patent discloses a package sealing tape having a layered structure. Its upper layer is a removable layer formed from polypropylene or polyester film, smooth and transparent. This upper layer is loosely adhered (by means of wax or corona discharge treatment) to a much thinner, transparent polymer layer. The polymer layer is bonded to an embossable lacquer layer formed from non-cross-linkable polyurethane or polyester. This layer is embossed to define a hologram, and then a metallic film, such as aluminum, is deposited upon this layer and is optionally coated with a polymeric coating. The lowest layer is a pressure sensitive transfer adhesive bound to release paper. In use, the release paper is removed, and then the tape is used to seal a container. The upper layer is scuff resistant, so it may be left on during transit to protect the hologram. It may also be removed. In the face of solvents or heat, the embossable layer and its hologram is quickly and irreversibly damaged, thus making a permanent record of the attempt at tampering with the package. A similar arrangement is disclosed in U.S. Pat. No. 6,659,507, issued to Michael Banahan, et al. on Dec. 9, 2003, which also provides an additional fluorescent pattern visible only under ultraviolet light and a mechanism that breaks up the hologram if the layers are separated.

U.S. Pat. No. 7,012,032, which issued to Steven R. Consentino, et al on Mar. 14, 2006, discloses in FIG. 3 of the '302 patent a holographic image (col. 7, lines 20-34 of the '032 patent) applied as the top layer in a laminated sealing member for a "bottle type container" with an upper PET layer, an intermediate thermal bonding polymer layer (a co polyester resin), and a lower woven or non-woven reinforcing scrim polymer layer (polyester such as PET) beneath which is an adhesive layer. In its "Background" portion, the '302 patent says: "seals and lids can be constructed to have a tab that extends outwardly from the periphery of the seal so that a user can grasp the tap to aid in removing the seal from the container." ('032 patent, col. 1, lines 37-40) FIG. 3 of the '032 patent discloses a tab 33 that is somehow attached to, and extending outwards from, the periphery of the lowest adhesive layer. The text accompanying this figure says: "Preferably the seal contains a small tab to facilitate removal." Nothing more is said about this tab.

U.S. Pat. No. 4,892,209, which issued to Jan L. Dorfman, et al. on Jan. 9, 1990, discloses a liquor bottle capping assembly which includes a sealing member that comprises two parts: First, a lower circular disk, made of aluminum or "high durometer plastic" or some other material sufficiently strong to resist and/or provide evidence of penetration by a hypodermic needle; and second, an upper circular sheet member 26 that is adhesively laminated to the lower circular disk 60. The upper circular sheet member may be made of metal foil and may carry a laser-imprinted hologram obtained from American Bank Note Holographics, Inc. Alternatively, the circular disk 80 may be constructed from plastic film, metallised plastic, or some other material that will provide evidence of any tampering. The upper circular sheet member initially has a figure-8 shape, and it is folded back upon itself to form joined upper and lower circular portions, the lower circular portion forming the circular sheet member itself, and the upper circular portion forming a removal tab of slightly smaller diameter, as is illustrated in FIGS. 1 and 2 of the '209 patent.

SUMMARY OF THE INVENTION

An embodiment of the present invention can be found in a holographic sealing member for a container that comprises a heat actuated sealant or adhesive layer that secures the sealing member to a container, a metal foil sealing layer over and covering and adhesively bonded to the heat actuated sealant or adhesive layer means, a holographic layer over and covering and adhesively bonding to the metal foil layer having an upper plastic layer and a lower embossed image layer, and a tab over and covering and adhesively bonded to the upper plastic layer that may be pulled to remove the tab and the plastic layer from a container, thereby exposing the lower embossed image layer which must then be perforated to gain access to the contents of the container.

DETAILED DESCRIPTION OF THE EMBODIMENTS

Figure 4:
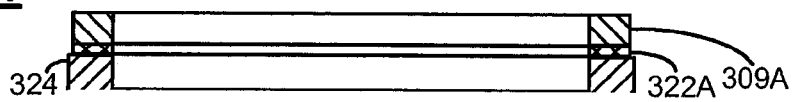
FIG. 4 presents a cross-sectional side view of the laminated sealing member shown in FIG. 3 following removal of the tab and the layers attached to the tab, the lowermost layers of the sealing member shown still attached to the mouth of the container.
Figure 5:
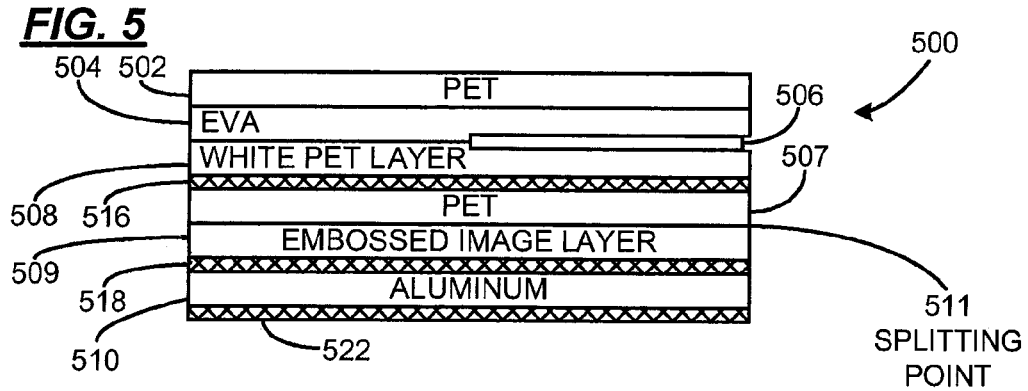
FIG. 5 presents a cross-sectional side view of a laminated sealing member in accordance with an embodiment of the invention having a removable tab structure facing to the right. The vertical dimensions are exaggerated and are not drawn in proportion to the actual vertical dimensions of each layer of the sealing member. (Cross-sectioning lines are omitted from some layers for clarity.)

A sealing member 500, designed in accordance with a first embodiment of the present invention, is illustrated in FIG. 5. FIG. 5 is described in several later paragraphs. The immediately following paragraphs describe FIGS. 3 and 4, which describe a related invention.

Figure 3:
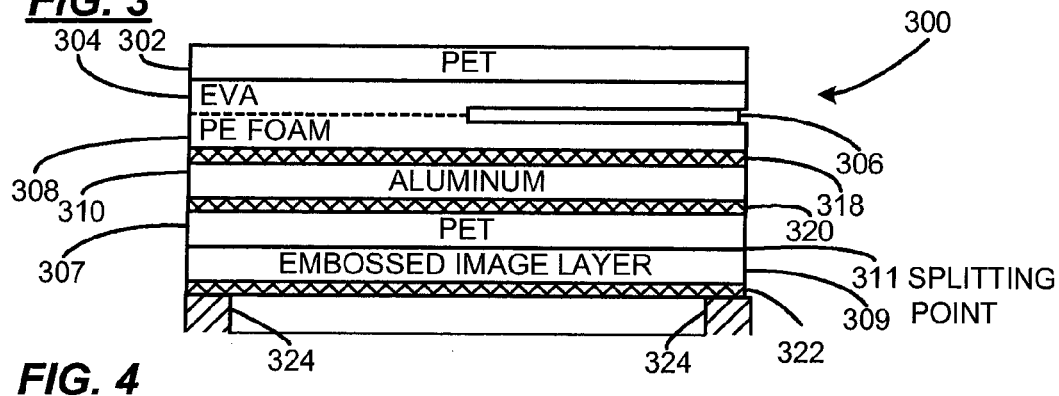
FIG. 3 presents a cross-sectional side view of a laminated sealing member having a removable tab structure facing to the right, the sealing member shown attached to the mouth of a container. The vertical dimensions are exaggerated and are not drawn in proportion to the actual vertical dimensions of each layer of the sealing member. (Cross-sectioning lines are omitted from some layers for clarity.)

FIG. 3 presents a side, cross-sectional view of the sealing member 300 and of the upper, circular rim of a PET container 324 to which the sealing member 300 is sealed by induction heating of an aluminum layer 310, which melts the hot melt bonding material or adhesive layer 322 and binds the sealing member 300 to the circular rim of the container 324. (Note that the cross sectioning lines have been omitted from the layers 302, 304, 308, 310, 307, and 309 in FIG. 3 and are shown in the urethane adhesive layers 318 and 320 and hot melt bonding material or adhesive layer 322.)

Figure 1:
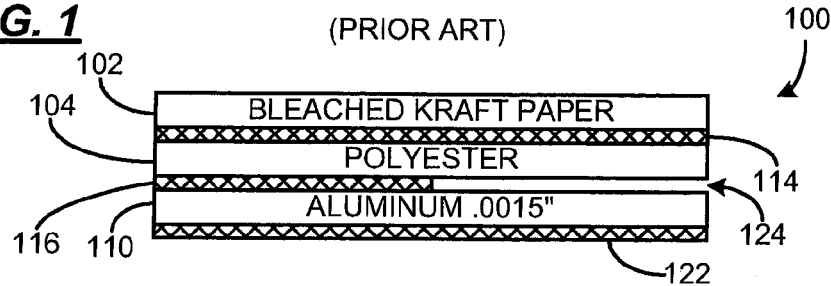
FIGS. 1 and 2 each present a cross-sectional side view of a prior-art laminated sealing member having a removable tab structure facing to the right. The vertical dimensions are exaggerated and are not drawn in proportion to the actual vertical dimensions of each layer of the sealing member. (Cross-sectioning lines are omitted from some layers for clarity.)
Figure 2:
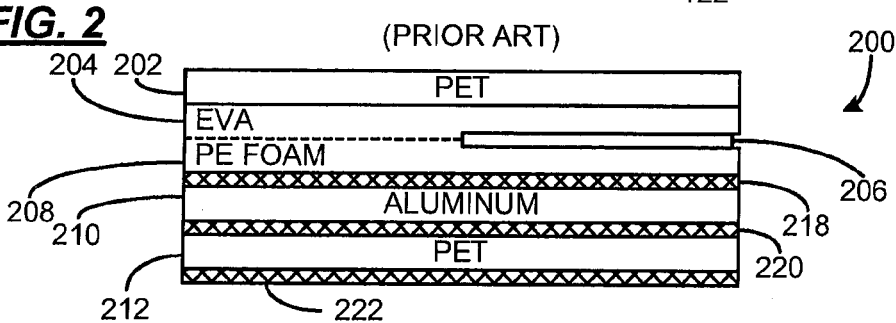

The structure of the sealing member 300 (FIG. 3) is essentially the same as that of the sealing member 200 (FIG. 2 described above) except that the lower PET layer 212 in FIG. 2 has been replaced in FIG. 3 with a holographic film comprising a PET layer 307 bonded to a embossed image layer 309 which bears a holographic image and which has an aluminum substrate. The layer 309 in its turn is bonded by the hot melt bonding material or adhesive layer 322 to the land area of the container 324 (the land area of the container 324 is the uppermost, ring-shaped upper surface of the circular upper rim of the container 324). The PET layer 307 and the embossed image layer 309 are bonded together in such a manner, and with such a bonding strength, that the layers 307 and 309 are separable along their periphery—the bond at a splitting point 311 is not as strong as the bond formed by the layer 322 between the layer 309 and the container 324.

Accordingly, when the tab formed by the layers 302, 304, and 306 is pulled, all of the uppermost layers 302, 304, 308, 310, and 307 of the sealing member 300 are pulled away along with all save a thin peripheral ring of the embossed image layer 309, leaving only a thin peripheral ring 309A (see FIG. 4) of the embossed image layer 309 sealed by means of a thin ring of the hot melt bonding material or sealing layer 322A to the land area of the container 324.

Accordingly, a circular ring of the embossed image layer 309A remains bonded to the land area of the container 324 after the sealing member 300 is removed. Thus, a thin ring of the hologram which the embossed image layer 309A carries remains attached to the upper lip of the container 324, while the remainder of the embossed image layer 309 is peeled away and is removed from the container 324 and is separated from the circular ring portion 309A of the layer 309. Hence, removal of the tab (formed by the layers 302, 304, and 306) necessarily produces destruction of the hologram such that the holographic seal borne by the embossed image layer 309 is torn through and can never be reassembled and reattached to the container 324.

The sealing member 300 is thus entirely removed in a single motion, but the ring portion 309A of the embossed image layer 309 remains behind, attached to the land area of the container 324, torn away from the remainder of the embossed image layer 309 in a way that destroys the hologram and makes it impossible to re-seal the sealing member 300 back onto the container 324. After the sealing member 300 is removed from the container 324, the holographic image is visible on the top side of the rim of the container 324. It is not possible to reseal the container.

The bonding of the PET layer 307 to the embossed image layer 309 is carefully controlled to set the amount of adhesion that exists between the PET layer 307 and the embossed image layer 309. This bonding strength must be low enough so that when force is applied to the tab formed by layers 302, 304, and 306, the sealing member 300 splits at the splitting point 311 around the periphery of the sealing member 300 but only above the land area of the container 324, thus permitting most of the embossed image layer 309 to be ripped away still attached to the layers 302, 304, 306, and 307 but leaving behind the ring portion 309A of the embossed image layer 309 attached to the land area of the container 324, as is shown in FIG. 4. PET holographic film produced by American Bank Note Holographics (ABNH) works well in this application. A product could be designed that would function in the same manner if the holographic film was modified to contain some type of release layer between the PET film layer 307 and the embossed image layer 309. The PET film produced by ABNH has proved (in its normal, unmodified form) to have a structure that functions properly.

The PET layer 307, the embossed image layer 309, and the bond between them are preferably chosen to be relatively heat insensitive so that overheating by inductive heating of the hot melt bonding material or adhesive layer 322 does not adversely affect the amount of effort that is required to remove the sealing member 300. In conventional designs, such as that shown in FIG. 2, it is the seal between the container (not shown in FIG. 2) and the entire sealing member 200 that must be broken, and the amount of effort that is required to remove the sealing member 200 can be adversely affected by overheating during the inductive heat sealing of the sealing member 200 to a container. The ABNH PET holographic film is relatively insensitive to heat variations, as is explained more fully in a later paragraph.

In another embodiment of the invention illustrated in FIGS. 3 and 4, two American Bank Note Holographics, Inc. films are included in the same structure. The structure is the same as described in FIGS. 3 and 4 with the addition of a second holographic film that is laminated between the aluminum foil layer 310 and the holographic film layer (layers 307 and 309) which is coated with the heat actuated coating (the layer 322). In addition, gold pigmentation is added to the adhesive layer between the two holographic film layers. When separation of the layer 322 and the metal and holographic embossed image layer 309 from the PET layer is invoked upon removal of the sealing member 300, the holographic ring 309A from the primary holographic layer remains on the rim of the PET container 324, and the uncovering of the area where this ring separates from the primary seal exposes the secondary holographic film that appears in gold because of the added pigmentation. This leaves a portion of a holographic image on the container rim and another portion on the removed sealing member 300 components.

The heat activated hot melt bonding material or adhesive layer 322 in FIG. 3 is a polyester heat seal coating 40-3 obtainable from Rohm and Haas. This heat actuated coating is applied to the metallic side of metallised holographic film (comprising the PET layer 307 and the embossed image layer 309 which includes a metal layer formed from aluminum). The PET side (307) of the holographic film is laminated and adhered to an aluminum foil layer 310. Above this foil layer 310 an optional insulating layer 308 (polyethylene foam in FIG. 3, for example) can be applied, and polyethylene, polypropylene, or polyester may be applied above this insulating layer, or these materials may be applied directly to the foil layer if the optional insulating layer 308 is absent. A tab defining PET release strip 306 is placed over and covers at least a portion of the foil layer 310 or insulating layer 308. An EVA or adhesive layer 304 lies above the PET release strip 206 and is covered by a PET layer 302 to form the tab that is used to remove the sealing member 300 from the rim of the container 324. The splitting or separation point 311 occurs within the holographic film layer. Because the embossed image layer 309 is thin and is bonded firmly to the rim of the container 324, in this case a PET container 324 to coincide with the PET heat seal coating (the hot melt bonding material or adhesive layer 322), the upper liner is completely removed from the rim, leaving the PET heat seal coating layer 322A and the metal and image layer 309A only on the rim of the container 324. A strong bond is desired between the layer 322 and the upper lip of the container 324 to firmly attach the ring of embossed image layer 309A to the upper lip of the container 324. Some other heat seal coating can be selected that can provide a seal to other types of containers—for example, a polypropylene heat seal coating or a polyethylene heat seal coating can be used with a container made of those materials. It may also prove feasible to extrusion coat the metal side of the holographic film with a suitable polymer film as thin as 0.5 mils that would provide the desired splitting and adhesion in the rim area of the container 324.

With reference to FIG. 5, the present invention is illustrated embodied in a sealing member 500. (Once again, the cross sectional lines are omitted from the layers 502, 504, 506, 508, 507, 509, and 510 in FIG. 5 for clarity and are shown in the urethane adhesive layers 516, and 518 and hot melt bonding material or adhesive layer 522.)

The sealing member 500 is similar to the sealing member 200 shown in FIG. 2, but the polyester foam layer 208 shown in FIG. 2 is replaced by a white PET layer 508 that is bonded to a holographic film formed by the combination of a PET layer 507 with an embossed image layer 509 that includes a metal (aluminum) layer, the layers 507 and 509 being bonded together in a manner such as to form a splitting point 511 that gives way then the layers 502, 504, and 506 are pulled. The splitting point 511 is thus within the holographic film structure, between the image layer 509 and the PET layer 507. The urethane adhesive layer 518 binds the metal and embossed image layer 509 to the upper surface of the adhesive coated (adhesive layer 522) aluminum foil layer 510. The adhesive layer 522 is an easily punctured film such as MDPE (medium density polyethylene) 1.5 mils in thickness, obtainable from Covalence Specialty Materials Corporation. This design allows the holographic embossed image layer 509 and aluminum film layer 510 to be destroyed easily by puncturing through these two layers. In this design, there is no PET acid barrier layer beneath the two layers 509 and 510, since such a layer would be difficult to penetrate with a finger. Other easily-punctured films, such as a NEX (a trademark of New England Extrusion, Inc.) sealant having an EVA content or SURLYN (a trademark of DuPont for a particular DuPont thermoplastic ionomer resin product), etc., may be used to form the layer 522.

The strength of the bond between the layers 507 and 509 is chosen to cause the sealing member 500 to split apart at 511 when the tab formed by the layers 506, 504, and 502 is pulled upwards and to the side. Accordingly, when the tab formed by the layers 506, 504, and 502 is pulled, the sealing member 500 splits apart at the splitting point 511, uncovering the hologram which is visible in the embossed image layer 509 and leaving in place the seal formed by the aluminum layer 510 that is bonded to the embossed image layer 509.

After removing the upper layers 502, 504, 506, 508, and 507 of the sealing member 500 by pulling on the tab formed by the layers 506, 504, and 502, an individual wishing to access the container (not shown) must then pierce the remaining layers 509 and 510, thus breaking the holographic seal over the container. Hence, the seal on the container cannot be broken without the simultaneous destruction of the hologram.

This design again uses ABNH PET holographic film. The chemistry of the image layer of this product supports heat resistance for the image. The image layer is highly cross-linked, and this gives the film superior heat resistance and also explains why the bond between the layers within the holographic film tend to be relatively weaker. Many holographic films do not have this heat resistance, especially if the image is cast on a polypropylene film. Since induction container sealing can produce temperatures that can be in the range of 350 to 450 degrees Fahrenheit, if the holographic film technology does not possess adequate heat resistance, then the image or film or both would become distorted during induction heating, particularly when excessive heating is applied.

By removing, separating, or splitting the PET layer away from the image layer, the image of the hologram remains undisturbed and completely legible above only an easily pierced layer of foil and sealant and can be destroyed by simply puncturing it with a finger. If the PET layer were not stripped away when the tab layers were pulled away, then the PET layer would need to have sufficient heat stability, and it would also have to maintain the integrity of the image layer. It would be difficult to puncture through the lining of such a structure.

An alternative arrangement omits the white PET layer 508 and the bonding material 516 and has the EVA layer 504 bonded directly to the PET layer 507.

While several embodiments of the invention have been described, numerous alternatives will occur to those skilled in the art. The claims appended to and forming a part of this patent application are intended to cover all such alternatives that fall within the true scope of the invention.

What is claimed is:

1. A holographic sealing member for a container comprising:
   a heat actuated sealant or adhesive layer for securing the holographic sealing member to a container;
   a sealing layer bonded to the heat actuated sealant or adhesive layer, the sealing layer comprising a metal foil layer;
   a holographic layer bonded to an upper surface of the metal foil layer, the holographic layer including an upper PET layer, an embossed image layer, and a lower metalized layer;
   a splitting point for the holographic sealing member between the upper PET layer and the embossed image layer of the holographic layer so that the upper PET layer can be split apart from the embossed image layer;
   a polyethylene or polypropylene or polyester foam or film layer bonded to the upper PET layer; and
   a PET tab defining layer extending over and covering at least a first portion of, but not bonded to the first portion of, the polyethylene or polypropylene or polyester foam or film layer to form a tab where upward pulling of the tab, with the placement of the holographic layer above the metal foil layer, causes the holographic sealing member to separate at the splitting point leaving the heat actuated sealant or adhesive layer, the sealing layer, the lower metalized layer, and the embossed image layer secured to a container so that an image formed by the embossed image layer and the lower metalized layer is undisturbed by splitting the upper PET layer apart from the embossed image layer by upward pulling of the tab.

2. The holographic sealing member in accordance with claim 1 wherein the lower metalized layer of the holographic layer is aluminum.

3. The holographic sealing member in accordance with claim 1 which further comprises a second holographic layer inserted between the holographic layer and the metal foil sealing layer and adhesively bonded to both, the adhesive between the holographic layer and the second holographic layer containing a coloring agent.

4. The holographic sealing member in accordance with claim 1 wherein the heat actuated sealant or adhesive layer for securing the holographic sealing member to a container includes a puncturable film formed of a medium density polyethylene.

5. The holographic sealing member in accordance with claim 1 comprising an EVA film or foam layer bonded to both a second portion of the polyethylene or polypropylene or polyester foam or film layer not covered by the PET tab defining layer and also to the PET tab defining layer itself.

6. The holographic sealing member in accordance with claim 5 comprising a third PET layer over and covering and bonded to the EVA film or foam layer.

7. The holographic sealing member in accordance with claim 6 wherein polyethylene or polypropylene or polyester foam or film layer comprises a fourth PET layer.

8. The holographic sealing member in accordance with claim 7 wherein the fourth PET layer is white.

9. A holographic sealing member for a container having a rim surrounding a container opening, the holographic sealing member comprising:
   a sealing portion having a periphery thereabout including a foil layer bonded to a rim of a container and a holographic layer bonded to an upper surface of the foil layer, the holographic layer having an upper plastic layer and a lower embossed image layer including a metal layer; and
   a tab structure bonded to the sealing portion and comprising a tab such that the tab may be pulled to remove the tab and, with the placement of the holographic layer above the foil layer, the upper plastic layer of the holographic layer from a container while leaving the lower embossed image layer, the metal layer, and the foil layer bonded to the container rim so that an image formed by the lower embossed image layer and the metal layer is undisturbed by the removal of the tab and the upper plastic layer, wherein the lower embossed layer, the metal layer, and the foil layer are puncturable to gain access to contents of the container.

10. The holographic sealing member of claim 9, wherein the tab lies wholly within the periphery of the sealing portion.

11. The holographic sealing member of claim 9, wherein the holographic layer has a splitting point between the upper plastic layer and the lower embossed image layer such that upon pulling of the tab, the holographic layer separates at the splitting point.

12. The holographic sealing member of claim 9, wherein the foil layer includes a heat actuated sealant or adhesive layer for bonding the sealing portion to a rim of a container.

13. The holographic sealing member of claim 9, wherein the strength of the bond between the tab and the upper plastic layer of the hologram is greater than the strength of the bond between the upper plastic layer and the lower embossed image layer of the hologram.

14. The holographic sealing member of claim 9, wherein the sealing portion further includes a PET layer covering the upper plastic layer.

15. The holographic sealing member of claim 14, wherein the PET layer is a non-foamed polymeric material.

\* \* \* \* \*